United States Patent

[11] 3,574,454

[72] Inventor  Karl Deeg
              Unterhaching, Germany
[21] Appl. No. 745,870
[22] Filed     July 18, 1968
[45] Patented  Apr. 13, 1971
[73] Assignee  AGFA-Gevaert Aktiengesellschaft
              Leverkusen, Germany
[32] Priority  July 20, 1967
[33]          Germany
[31]          P 15 72 542.9

[54] SLIDE PROJECTOR
     13 Claims, 2 Drawing Figs.
[52] U.S. Cl. ..................................................... 353/114,
                                              353/113, 353/94
[51] Int. Cl. ....................................................... G03b 23/14
[50] Field of Search ........................................... 353/112,
                  113, 111, 116, 114, 94, 103, 89, 86, 90, 92

[56]              References Cited
              UNITED STATES PATENTS
3,264,937  8/1966  Antos ............................  353/112

Primary Examiner—Harry N. Haroian
Attorney—Michael S. Striker

ABSTRACT: A slide projector wherein a reciprocable slide changer alternately transports lowermost slides from a centrally located tray to two projecting stations by moving the slides in a first plane which is parallel to the common plane of the projecting stations. Springs cause the thus transported slides to move from the first into the second plane and clamp the slides in registry with the respective stations. An evacuating device is reciprocable in response to reciprocation of the slide changer to remove slides from stations which are about to receive fresh slides and to transport the thus removed slides into a collecting receptacle wherein the slides are stacked in the same order in which they are being removed from the tray.

SLIDE PROJECTOR

BACKGROUND OF THE INVENTION

The present invention relates to slide projectors in general, and more particularly to improvements in slide projectors of the type wherein a slide whose image is being projected onto a screen can be held in one of two spaced positions. Such slide projectors are normally provided with a shutter or diaphragm which can prevent the projection of the image of a slide at one projecting station while the image of a slide at the other projecting station is being projected, or vice versa.

In conventional slide projectors of the just outlined character, slides are removed from a stack and are transported alternately to the two projecting stations. While the slide changer moves a slide from the stack toward one of the stations, it also expels a slide from the other projecting station. The thus expelled slide must be withdrawn by hand and is thereupon placed onto a stack wherein the slides are accumulated in the same sequence in which their images are being projected onto the screen. A slide projector of the aforementioned type is described in the U.S. Pat. No. 3,093,030.

SUMMARY OF THE INVENTION

One of the objects of my invention is to provide a slide projector which defines two projecting stations with novel and improved means for transporting slides to such stations and with novel means for evacuating slides from the stations to provide room for fresh slides.

Another object of the invention is to provide a slide projector wherein slides are automatically stacked in the same sequence in which their images are being projected onto a screen.

A further object of the invention is to provide a novel slide changing and slide evacuating mechanism for use in projectors of the above outlined character.

The improved slide projector comprises a pair of locating means disposed in a first plane and defining a first and a second projecting station, a support located in a second plane between the two stations and arranged to carry the lowermost or foremost slide of a supply of stacked slides which can be stored in a magazine or tray, movable slide changer means comprising slide transporting means located in or adjacent to the second plane to respectively transport the foremost slide and the next-following slide from the support into registry with the first and second stations in response to movement in a first and a second direction, and guide means for moving the thus transported slides from the second plane into the first plane.

The novel evacuating means comprises two evacuating portions or members for respectively removing slides from registry with the first and second stations in response to movement of the transporting means in the first and second directions and for delivering the thus removed slides into a receptacle or tray wherein the slides accumulate in the same sequence in which they are removed from the magazine.

The operative connection between the slide changer means and the evacuating means may comprise two racks which are respectively provided on the slide changer means and evacuating means, and a pinion which is rotatable about a fixed axis and meshes with the two racks. The pinion may be rotated by hand, by means of a reversible motor or in response to manually or motorically induced reciprocation of one of the racks.

The novel features which are considered as characteristic of the invention are set forth in particular in the appended claims.

The improved slide projector itself, however, both as to its construction and its mode of operation, together with additional features and advantages thereof, will be best understood upon perusal of the following detailed description of certain specific embodiments with reference to the accompanying drawing.

FIG. 1 is a fragmentary perspective view of a slide projector which embodies the invention; and FIG. 2 is a vertical sectional view as seen in the direction of arrows from the line II–II of FIG. 1.

DESCRIPTION OF THE PREFERRED EMBODIMENTS

Figure 1:
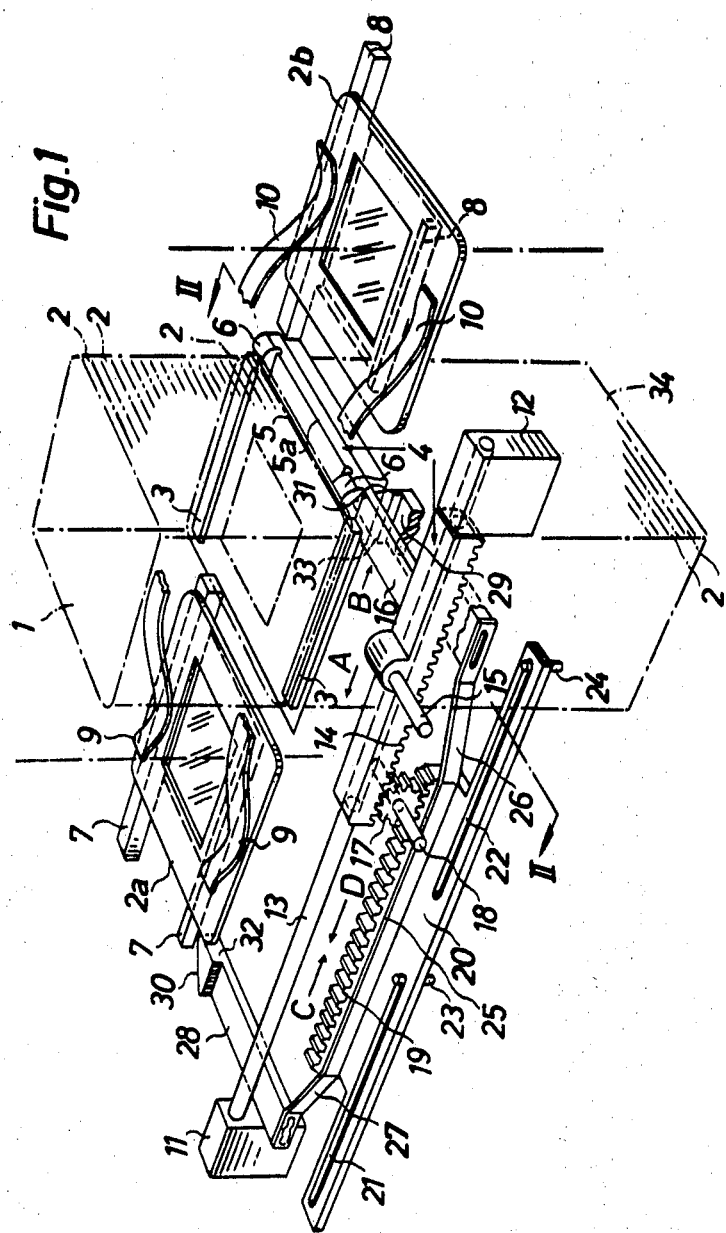
Figure 2:
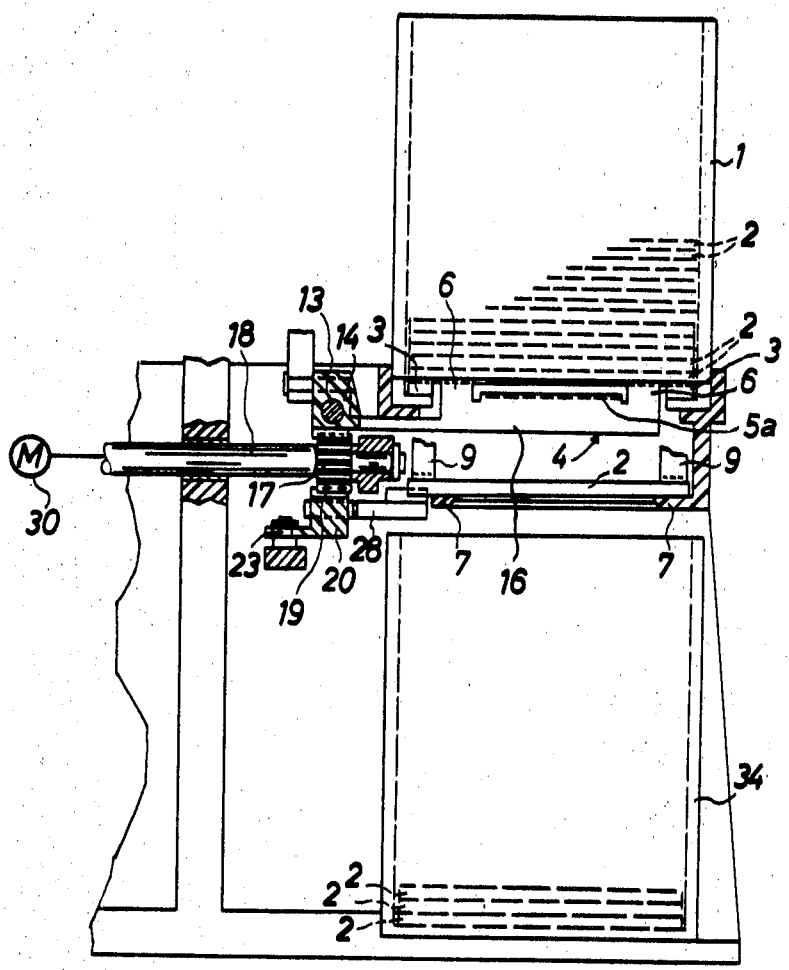

FIGS. 1 and 2 illustrate a magazine or trays 1 (shown by phantom lines) which accommodates a supply of stacked slides 2. Two parallel strips 3 constitute a support for the lowermost slide 2 in the magazine 1; these strips are shown as being located in a horizontal plane at a level at least slightly above a further horizontal plane for two projecting stations respectively defined by pairs of locating strips 7, 8 disposed at the opposite sides of the tray 1. The slide changer 4 has a slide transporting bar 16 which is reciprocable slightly below the plane of the strips 3 and serves to deliver successive slides 2 alternately to the two projecting stations. The bar 16 has two elongated edge portions or shoulders 5, 5a the former of which can transport a slide from the strips 3 toward the strips 7 and the latter of which can deliver a slide from the strips 3 toward the strips 8 when the slide changer 4 respectively moves in the directions indicated by arrows A and B. The bar 16 is further provided with two longitudinally spaced roof-shaped lifting projections 6 which raise the stack of slides above the lowermost slide 2 in the tray 1 to reduce friction between the lowermost slide (which is being transported by the edge portion 5 or 5a) and the adjoining next-to-the-lowermost slide.

The guide means for moving slides 2 from the plane of the strips 3 into the plane of the strips 7 and 8 comprises two pairs of leaf springs 9, 10 which perform the additional function of urging the frames of slides against the strips 7, 8 when such slides reach the respective projecting stations. FIG. 1 illustrates two slides 2a, 2b which are respectively located at the left-hand and right-hand projecting station and are biased against the strips 7, 8 by springs 9, 10.

The frame of the slide projector comprises two bearing blocks 11, 12 which support the ends of an elongated guide rod 13 for a carriage 14 of the slide changer 4. The carriage 14 constitutes an elongated rack which is in mesh with a pinion 17 whose shaft 18 is mounted in the frame of the projector. The slide changer 4 further comprises a handle 15 which can be reciprocated by hand in directions indicated by arrows A and B to thereby move slides 2 from the magazine 1 to the projecting stations accommodating the locating strips 7 and 8. The carriage 14 is rigid or integral with the bar 16.

The pinion 17 is in mesh with a second rack 19 which forms part of a slide evacuating or removing device 20. The latter comprises two parallel elongated slots 21, 22 for fixed guide pins 23, 24 carried by the frame of the projector. The rack 19 is connected to the central portion of a leaf spring 25 whose end portions 26, 27 respectively carry evacuating members or pushers 29, 28. These pushers respectively comprise sloping cam faces 31, 30 which enable them to bypass slides in projecting positions and shoulders or edge faces 33, 32 which entrain slides from projecting positions toward and into a collecting receptacle 34 which is placed into the projector at a level below the tray 1.

The operation is as follows:

In the first step, the user places a tray 1 into the projector so that the lowermost slide 2 in the tray rests on the support including the strips 3. Such slide is then located in a horizontal plane at a level above the plane of the projecting stations (strips 7 and 8), In the next step, the slide changer 4 is moved in the direction indicted by arrow A (by way of the handle 15) whereby the edge portion 5 of the bar 16 engages the frame of the lowermost or outermost slide 2 in the tray 1 and causes such slide to travel along the strips 3 and into the range of the leaf springs 9 which move the slide into the left-hand projecting station and clamp the frame of such slide against the locating strips 7. While the bar 16 travels below the tray 1, its projections 6 raise the next-to-the-lowermost slide 2 to reduce friction between the slide which is being transported by the edge portion 5 and the remainder of the stack in the tray 1.

The evacuating device 20 is caused to move in response to movement of the slide changer 4 but in the opposite direction (arrow C in FIG. 1). If the left-hand projecting station of FIG. 1 is empty when the slide changer 4 transports a slide 2 toward the locating strips 7, the pusher 28 of the evacuating device 20 simply travels toward the tray 1 but does not transport a slide into the receptacle 34. However, if a slide (2a) is held by the springs 9 and locating strips 7 at the left-hand projecting station when the slide changer 4 transports a slide from the tray 1 (arrow A), the shoulder 32 of the pusher 28 causes the slide 2a to advance in the direction indicated by arrow C and to provide room for the slide 2 which is being transported by the edge portion 5 of the bar 16. The slide 2a is free to descend into the receptacle 34 by gravity not later than at the time when the slide transported by the edge portion 5 reaches the left-hand projecting station of FIG. 1.

If the right-hand projecting station of FIG. 1 accommodates a slide (2b) while the edge portion 5 of the bar 16 transports a slide 2 onto the strips 7, the position of the slide 2b remains unchanged so that its image can be projected onto a screen. As stated before, the evacuating device 20 moves in the direction indicated by arrow C when the slide changer 4 moves in the direction indicated by arrow A; the cam face 31 of the pusher 29 then slides along the frame of the slide 2b and causes the end arrow D. 26 of leaf spring 25 to undergo a certain deformation which suffices to permit movement of the pusher 29 to strips right of and beyond the slide 2b. The deformation of the end portion 26 is slide when the pusher 29 advances beyond the slide 2b.

When the projection of the image of the slide 2b is terminated, the operator moves the slide changer 4 in the direction indicated by arrow B whereby the pinion 17 causes the evacuating device 20 to move in the direction indicated by arrow D. The edge portion 5a transports the lowermost slide 2 from the tray 1 along the support including the strips 3 and toward the locating strips 8 while the shoulder 33 of the pusher 29 transports the slide 2b toward the receptacle 34. The sloping cam face 30 of the pusher 28 engages the slide resting on the locating strips 7 and causes some deformation of the end portion 27 of the leaf spring 25. The slide 2b descends into the receptacle 34 and comes to rest on the slide 2a. Thus, the slides are stacked in the receptacle 34 in the same sequence in which they are being removed from the tray 1.

An important advantage of the projector which embodies the structure shown in FIGS. 1 and 2 is that its optical system can project the images of two slides at a time. Thus, and referring to FIG. 1, the images of slides 2a, 2b can be projected simultaneously. Of course, it is equally possible to project the image of one slide at a time. The projector is equipped with shutter means (not shown) which can prevent passage of light through one of the slides 2a, 2b while the image of the other slide is being projected onto a screen. When the projection of images of all slides is completed, the receptacle 34 can be removed from the projector and can be used for renewed projection of images in the same sequence. The evacuated tray 1 is then placed into the position previously occupied by receptacle 34. Aside from the manual shifting of slide changer 4, the operation of the slide projector shown in FIGS. 1 and 2 is analogous to that of a fully automatic projector. All that the operator has to do is to place a loaded tray 1 into the projector, to place an empty receptacle 34 below the tray 1, and to move the slide changer 4 back and forth in order to change the slides at the two projecting stations.

It is clear that the improved projector and its slide changing, evacuating and stacking parts can be modified in a number of ways without departing from the spirit of the invention. For example, and as indicated in FIG. 2, the shaft 18 of the pinion 17 can be coupled to the output shaft of a reversible electric motor 20. Alternatively, the motor 30 or another suitable motor can drive the handle 15 of the slide changer 4 by way of a crank drive, eccentric or another transmission. The motor 30 can be disconnected from the shaft 18 when the operator wishes to manipulate the slide changer 4 by hand. Also, the transmission 14, 17, 19 can be replaced by a linkage, a train of gears or the like.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a slide projector, a combination comprising a pair of locating means disposed in a first plane and defining a first and a spaced second projecting station; a support located in a second plane between said locating means and arranged to carry an outermost slide of a supply of stacked slides; movable slide changer means comprising slide transporting means located in said second plane to respectively transport the outermost slide and the next-following slide from said support into registry with the first and second stations in response to movement in a first and a second direction; guide means for moving the thus transported slides from said second into said first plane; and evacuating means comprising two evacuating members for respectively removing slides from registry with said first and second stations in response to movement of said transporting means in said first and second directions, and resilient means supporting said evacuating members.

2. A combination as defined in claim 1, wherein each of said evacuating members comprises a pusher having a cam face which enables it to bypass a slide at the respective projecting station in response to movement of the pusher in the direction in which the transporting means advances in order to transport a slide from said support to the respective station.

3. In a slide projector, a combination comprising a pair of locating means disposed in a first plane and defining a first and a spaced second projecting station; a support located in a second plane between said locating means and arranged to carry the outermost slide of a supply of stacked slides, said outermost slide constituting the lowermost slide of said supply; movable slide changer means comprising slide transporting means located in said second plane to respectively transport the lowermost slide and the next-following slide from said support into registry with the first and second stations in response to movement in a first and a second direction, and means for lifting the remainder of the supply of stacked slides with reference to the lowermost slide in response to movement of said transporting means in either one of said directions; guide means for moving the thus transported slides from said second into said first plane; and evacuating means comprising two evacuating members for respectively removing slides from registry with said first and second stations in response to movement of said transporting means in said first and second directions.

4. A combination as defined in claim 3, wherein said transporting means comprises two motion transmitting portions one of which transports slides to the one and the other of which transports slides to the other of said stations.

5. In a slide projector, a combination comprising a pair of locating means disposed in a first plane and defining a first and a spaced second projecting station; a support located in a second plane between said locating means and arranged to carry an outermost slide of a supply of stacked slides; movable slide changer means comprising slide transporting means located in said second plane to respectively transport the outermost slide and the next-following slide form said support into registry with the first and second stations in response to movement in a first and a second direction; guide means for moving the thus transported slides from said second into said first plane; evacuating means comprising two evacuating member for respectively removing slides from registry with said first and second stations in response to movement of said transporting means in said first and second directions, said slide changer means and said evacuating means being respectively provided with first and second racks; and pinion means rotatable about a predetermined axis and meshing with said racks so that one of said racks is moved in one direction in response to movement of the other rack in the other direction and vice versa.

6. A combination as defined in claim 5, wherein said first plane is located at a level below said second plane.

7. A combination as defined in claim 5, further comprising means for collecting slides removed by said evacuating members in the same sequence in which the slides are being removed from said support.

8. A combination as defined in claim 5, wherein said guide means comprises resilient elements.

9. A combination as defined in claim 5, further comprising motor means for rotating said pinion means.

10. A combination as defined in claim 5, wherein said slide changer means comprises handle means by means of which said slide changer means is movable in said directions.

11. A combination as defined in claim 5, wherein said slide changer means is reciprocable in a substantially horizontal plane and said support is arranged to carry a tray containing a stack of horizontal slides the lowermost one of which rests on said support in the path of movement of said transporting means.

12. A combination as defined in claim 11, further comprising a removable receptacle located at a level below said support and arranged to collect slides which are removed from said stations by said evacuating members whereby the thus removed slides enter the receptacle by gravity feed.

13. A combination as defined in claim 5, further comprising transmission means connecting said evacuating means to said slide changer means for movement in said second direction on movement of said slide changer means in said first direction, and vice versa.